United States Patent [19]
Oravetz

[11] Patent Number: 6,066,042
[45] Date of Patent: May 23, 2000

[54] PASSIVE VENTILATION SYSTEM

[75] Inventor: Thomas A. Oravetz, Springfield, Mo.

[73] Assignee: Champion Products, Inc., Strafford, Mo.

[21] Appl. No.: 08/867,518

[22] Filed: Jun. 2, 1997

[51] Int. Cl.[7] ...................................................... F24F 7/00
[52] U.S. Cl. ............................................. 454/237; 429/71
[58] Field of Search ............................ 126/85 B; 429/71, 429/82, 83; 454/8, 48, 57, 184, 23, 250

[56] References Cited

U.S. PATENT DOCUMENTS

| 627,010 | 6/1899 | Perdue | 454/48 X |
|---|---|---|---|
| 960,921 | 6/1910 | Hill | 454/237 |
| 1,112,861 | 10/1914 | Snyder | 429/71 |
| 1,236,673 | 8/1917 | Chamberlain | 429/71 |
| 1,313,512 | 8/1919 | Bedell et al. | 429/71 X |
| 2,364,144 | 12/1944 | Hunsaker | 454/237 X |
| 3,271,710 | 9/1966 | Leonard | 454/237 X |
| 4,111,004 | 9/1978 | Blomberg | 126/85 B X |
| 5,660,587 | 8/1997 | Baer | 454/237 |

FOREIGN PATENT DOCUMENTS

| 800329 | 8/1958 | United Kingdom | 429/71 |

Primary Examiner—Harold Joyce
Attorney, Agent, or Firm—Shock, Hardy & Bacon L.L.P.

[57] ABSTRACT

An enclosure (10) is provided for storing a battery (12) or other device that emits hydrogen or other potentially explosive, lighter-than-air gas during operation. The enclosure includes a floor (14), ceiling (16) and side walls (18) defining a substantially air-tight interior space, and a ventilation system for venting the low density gas from the space. The ventilation system includes a first passageway (20) extending through the side wall (18) into an upper end of the space and including an inlet (24) disposed in the interior space at the upper end and an outlet (26) disposed outside the space. Also, the system includes a second passageway (22, 42) that extends into a lower end of the space, terminating at an outlet disposed within the enclosure adjacent the upper end of the interior space. The second passageway (22, 42) includes an inlet (34) disposed outside the space and an outlet (36) disposed within the space adjacent the upper end such that low-density gas within the space can self-vent from the enclosure by passing out of the first passageway (20), drawing ambient air into the second passageway (22, 42). A generally horizontal section (30, 46) of the second passageway extends across the lower end of the interior space and includes a heat conductive surface so that heat is transferred between the second passageway (22, 42) and the interior space of the enclosure, equalizing the temperature of the gas in the second passageway with the gas in the lower end of the interior space to minimize thermally-induced gas flow through the passageways (20, 22, 42).

15 Claims, 1 Drawing Sheet

PASSIVE VENTILATION SYSTEM

BACKGROUND OF THE INVENTION

The present invention relates generally to ventilated enclosures for batteries and other devices that generate potentially explosive or noxious lighter-than-air gases, and more particularly to a passive ventilation system for use in such an enclosure.

It is conventional to employ batteries as a primary or back-up source of electrical power at commercial office buildings and other populated sites, as well as in remote areas to power communications equipment and the like. Typically, batteries used in these environments are housed in insulated, air-tight enclosures that insulate the batteries from ambient temperature variations and the elements of weather. However, because many types of batteries produce hydrogen when overcharged, it is necessary to ventilate the battery enclosure to prevent the build-up of hydrogen beyond an explosive limit.

A known system for use in ventilating hydrogen from a battery enclosure is a passive system which includes a pair of vents that allow hydrogen or any other lighter-than-air gas in the enclosure to vent due to the density difference between the gas and ambient air. One of the vents in the known construction is located at the upper end of the enclosure, and functions as an exhaust from which the low density gas vents from the enclosure, and the second vent permits fresh air to replace the low density gas within the enclosure. Although the second vent is also provided at the top of the enclosure, it includes a horizontal section that extends across the top of the interior space of the enclosure, and a vertical section that depends from the horizontal section toward an opening spaced slightly from the floor of the enclosure.

By providing the horizontal section in the second vent, the conventional construction achieves heat transfer between the gases in the enclosure and the gases in the horizontal section of the second vent, reducing the degree of ventilation of the enclosure that would otherwise occur due to temperature differences between the interior of the enclosure and ambient air. In addition, the down-turned configuration of the conventional construction further reduces temperature-driven ventilation of the enclosure.

SUMMARY OF THE INVENTION

It is an object of the present invention to provide a passive system for ventilating lighter-than-air gases from an enclosure, wherein the system is passive in nature, requiring no power-driven fans or other moving components capable of failure.

In addition, it is an object of the invention to provide a passive ventilation system having a construction that effectively eliminates or minimizes ventilation caused by temperature differences between the interior space of the enclosure and the ambient air, or by pressure gradients across openings of the enclosure.

In accordance with these and other objects evident from the following description of a preferred embodiment of the invention, a ventilation system is provided which includes a first passageway extending through the side wall of an enclosure into a upper end of the interior space of the enclosure, and a second passageway extending through the side wall into the lower end of the interior space. the first passageway includes an inlet disposed in the interior space at the upper end and an outlet disposed in the exterior space, and the second passageway includes an inlet disposed in the exterior space and an outlet disposed in the interior space adjacent the upper end. The second passageway also includes a generally horizontal section extending across the lower end of the interior space, wherein the generally horizontal section has a heat conductive surface exposed to the interior space so that heat is transferred between the second passageway and the interior space of the enclosure, equalizing the temperature of the gas in the second passageway with the gas in the lower end of the interior space to minimize thermally-induced gas flow through the passageways.

By providing an apparatus in accordance with the present invention, numerous advantages are realized. For example, the inventive ventilation system is configured to facilitate ventilation of lighter-than-air gases from the enclosure while substantially eliminating temperature-driven ventilation, providing a self-valving operation that obviates the need for a separate power-driven fan or active valving mechanism that would be subject to malfunction. In addition, by providing a ventilation system in which heat is transferred between the gases in the enclosure and ambient air entering the interior space, the temperature gradient between the gases entering and exiting the enclosure is reduced, further eliminating thermally driven circulation through the enclosure.

BRIEF DESCRIPTION OF THE DRAWING

The preferred embodiment of the present invention is described in detail below with reference to the attached drawing figures, wherein.

DETAILED DESCRIPTION OF THE PREFERRED EMBODIMENT

Figure 1:
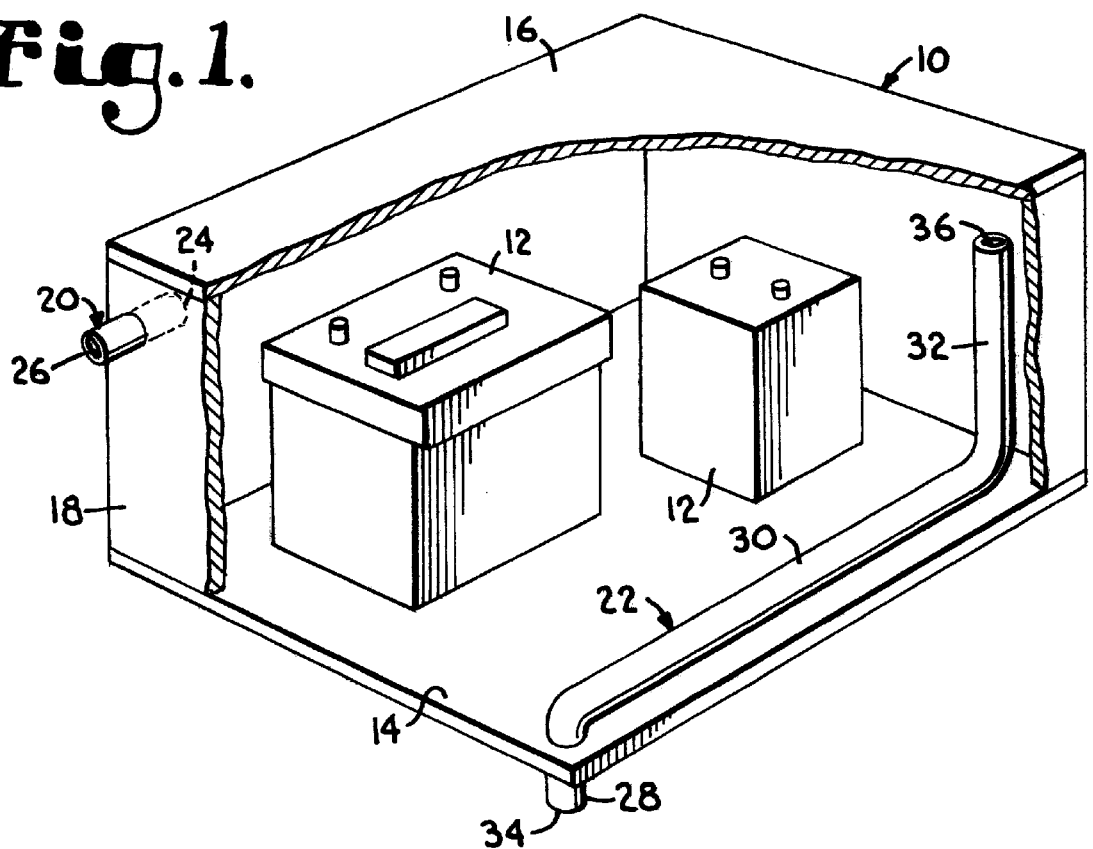
FIG. 1 is a perspective view of an enclosure incorporating a first passive ventilation system constructed in accordance with the preferred embodiment.

A battery enclosure 10 incorporating a first passive ventilation system constructed in accordance with the preferred embodiment is illustrated in FIG. 1, and broadly includes a floor 14, a ceiling 16, and a plurality of side walls 18, all of which together define an insulated, airtight interior space within which one or more batteries 12 are stored. Although the preferred embodiment is described with reference to a battery enclosure for use in ventilating hydrogen produced by batteries during use, the invention has application to any enclosure that is to be used to store a device that produces a relatively low-density, i.e. lighter-than-air gas, wherein the gas is to be ventilated for one reason or another without excess air being circulated through the enclosure.

The ventilation system incorporated in the enclosure 10 broadly includes two conduits 20,22, each defining a passageway through which gas is free to circulate between the interior space within the enclosure and the space exterior of the enclosure. The upper conduit 20 extends through one of the side walls 18 of the enclosure immediately adjacent the ceiling 16, and defines a first passageway. The conduit 20 is constructed of a short straight tubular piece of metal or other suitable material, and includes an inlet 24 disposed within the interior space and an outlet 26 disposed outside the enclosure. The conduit 20 provides gaseous communication between the interior and exterior spaces so that low-density gas produced within the enclosure is ventilated due to the difference in density between the gas and ambient air.

Preferably, the conduit 20 is horizontally disposed so that the inlet 24 and outlet 26 are at the same height as one another. However, the outlet could be disposed higher than the inlet, if desired. In addition, it is possible to fit a hood on the outlet of the conduit to prevent wind from blowing through the conduits or creating a temporary pressure gradient that would unnecessarily circulate air through the enclosure.

The lower conduit 22 extends through the floor 14 of the enclosure 10 adjacent one of the side walls 18, and defines a second passageway between the interior and exterior of the enclosure. The conduit is constructed of three straight tubular sections 28, 30, 32 of metal that are connected together by tubular elbows, although other heat-conductive materials could also be used. The outer section 28 is a vertical section passing through the floor 14, and presents a downward directed inlet 34 exterior of the enclosure. The intermediate section 30 is generally horizontal, extending along the floor substantially the entire width of the enclosure. The inner section 32 extends vertically from the intermediate section 30, and terminates adjacent the ceiling at an upward facing outlet 36. In addition, it is possible to fit a hood on the outlet of the conduit to prevent wind from blowing through the conduits or creating a temporary pressure gradient that would unnecessarily circulate air through the enclosure.

Like the first conduit 20, the second conduit 22 provides gaseous communication between the interior and exterior spaces. However, the horizontally disposed intermediate section 30 of the second conduit 22 also performs a heat-transfer function that reduces the temperature gradient between the gas in the interior space of the enclosure and the air in the lower conduit so that the air in the conduit is at or near the same temperature as the gas in the enclosure. In addition, because the lower conduit includes the vertical inner section 32, any gas in the lower conduit must rise through the section to enter the enclosure, making it difficult for relatively cool gases to pass up through the lower conduit. As such, temperature gradients alone do not provide a sufficient driving force to cause air to circulate through the enclosure, absent the buildup of low-density gas within the interior space.

Figure 2:
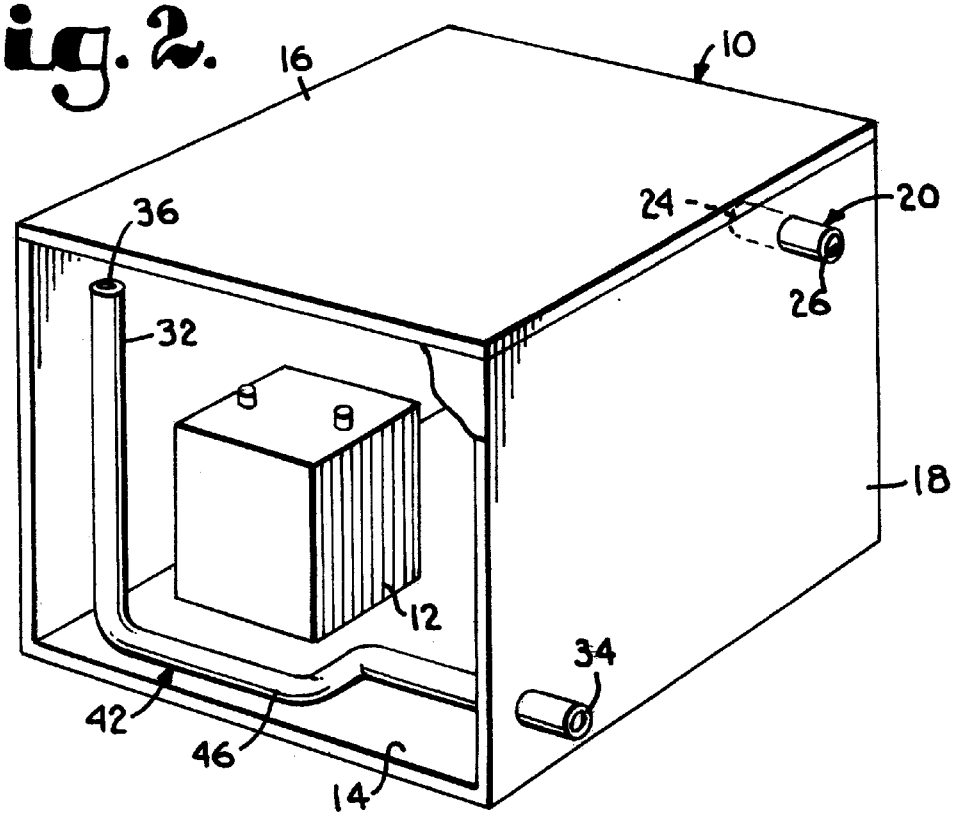
FIG. 2 is a perspective view of an enclosure incorporating a second passive ventilation system constructed in accordance with the preferred embodiment.

An enclosure provided with a second ventilation system constructed in accordance with the invention is illustrated in FIG. 2, wherein a lower conduit 42 is provided which passes through the same side wall of the enclosure as the upper conduit 20. As such, the pressure experienced at an inlet 34 of the lower conduit 42 and the outlet 26 of the upper conduit 20 will usually be the same as wind encounters the enclosure, reducing the effect of a pressure gradient across these openings.

In addition, a horizontally extending intermediate section 46 of the lower conduit 42 includes one or more turns or elbows in it to extend the length of the section beyond the length of the corresponding section of the conduit shown in FIG. 1. As such, more surface area is provided between the conduit 42 and the interior space of the enclosure, facilitating heat transfer between the air in the conduit and the gas in the interior space. Additional turns or bends may be included in the horizontally extending intermediate section 46 as needed to achieve the desired degree of heat transfer necessary to eliminate temperature-driven circulation of gas through the enclosure.

In both systems described herein, the outlet opening in the lower conduit is spaced slightly from the ceiling 16 of the enclosure to permit free passage of air between the interior space and the conduit. If the opening 36 is too close to the ceiling 16, the ceiling constricts gas flow through the conduit, reducing the ability of the ventilation system to exhaust the lighter-than-air gases produced within the enclosure. However, if the opening 36 is spaced from the ceiling by too great a distance, the self-valving effect provided by the system suffers, permitting temperature gradients and the density effect caused by normal thermal stratification between the spaces inside and outside the enclosure 10 to drive unnecessary and unwanted circulation. Thus, the vertical position of the opening is chosen to maximize both the ventilation of low-density gas from the enclosure and the regulation of temperature-driven circulation.

Although the preferred enclosure could be used to ventilate an enclosure for any device that produces a lighter-than-air gas, it is described with reference to a battery enclosure because batteries are sensitive to variations in temperature, and benefit from a constant temperature in the range of 70–80 degrees Fahrenheit. As such, a significant advantage is obtained by providing an enclosure having a ventilation system that facilitates the ventilation of built up low-density gases while eliminating excess temperature exchange with ambient air in the absence of low-density gas. In addition, although the gas produced by many commonly used types of batteries is hydrogen, the invention has application with devices that produce other low-density gases.

Returning to the preferred embodiment, when hydrogen is produced under normal operating conditions, it vents from the upper conduit 20 due to its lower density relative to the air inside and outside the enclosure. As the gas vents, fresh air is drawn into the lower conduit 22, 42 and maintains the pressure of the interior space substantially equal to the ambient pressure.

If the ambient temperature rises relative to the temperature of the gas within the interior space, the warm ambient air attempts to enter the conduits 20, 22, 42, but is prevented from doing so because the flow's temperature will be cooled by the cool gases in the lower end of the enclosure, and throughout the length of the lower conduit, and because the interior gases which are cooler than the outside air must rise through less dense warmer air to exit the enclosure. In addition, warm air entering the lower conduit 22, 42 is cooled by the transfer of heat from the cool gas within the enclosure and is trapped within the horizontally extending section 30, 46 such that it does not rise through the vertical inner section 32 into the interior space.

If the ambient temperature drops below the temperature of the gases in the interior space, the warm air in the enclosure 10 tries to vent from the upper conduit 20, attempting to draw air into the lower conduit 22, 42. However, because air drawn into the lower conduit is at or below the temperature of the gas at the bottom of the interior space, it is trapped in the intermediate section and does not rise through the vertical inner section into the interior space. Thus, the configuration and location of the conduits provides a self-valving of the air flow into and out of the interior space such that low-density gas is allowed to vent while high-temperature or low-temperature air are not.

Although the present invention has been described with reference to the preferred embodiment, it is noted that equivalents may be employed and substitutions made herein without departing from the scope of the invention as recited in the claims.

What is claimed is:

1. In an enclosure for a device capable of emitting a gas having a density lower than the density of ambient air, wherein the enclosure defines a substantially air-tight interior space having upper and lower ends and a surrounding exterior space, a passive ventilation system for exhausting the low-density gas, the system comprising:

a first passageway extending through the enclosure into the upper end of the interior space, and including an inlet disposed in the interior space at the upper end and an outlet disposed in the exterior space, the first passageway providing gaseous communication between the interior and exterior spaces so that low-density gas is ventilated from the upper end of the interior space; and a second passageway extending through the enclosure into the lower end of the interior space, and including an inlet disposed in the exterior space and an outlet disposed in the interior space adjacent the upper end, the second passageway providing gaseous communication between the exterior and interior spaces, and including a generally horizontal section extending across the lower end of the interior space, the generally horizontal section having a heat conductive surface exposed to the interior space so that heat is transferred between the second passageway and the interior space of the enclosure, equalizing the temperature of the gas in the second passageway with the gas in the lower end of the interior space to minimize thermally-induced gas flow through the passageways.

2. A passive ventilation system as recited in claim 1, wherein the inlet and outlet of the first passageway are at the same height relative to the enclosure, and the first passageway includes a generally horizontal section that extends between the inlet and the outlet of the first passageway.

3. A passive ventilation system as recited in claim 1, wherein the inlet of the first passageway is disposed at a height equal to or above the height of the outlet of the second passageway.

4. A passive ventilation system as recited in claim 1, wherein the first passageway includes a straight, horizontally extending upper tube.

5. A passive ventilation system as recited in claim 1, wherein the second passageway includes a lower tube having horizontally and vertically extending sections disposed in the interior space.

6. A passive ventilation system as recited in claim 5, wherein the horizontally extending section of the lower tube includes a means for facilitating heat transfer between the second passageway and the interior space.

7. A passive ventilation system as recited in claim 5, wherein the enclosure includes a floor, ceiling and side wall, and the lower tube of the second passageway extends through the side wall.

8. A passive ventilation system as recited in claim 5, wherein the enclosure includes a floor, ceiling and side wall, and the lower tube of the second passageway extends through the floor.

9. An enclosure for storing a device capable of emitting a gas having a density lower than the density of ambient air, comprising:

a floor, ceiling and side wall defining a substantially air-tight interior space having upper and lower ends and a surrounding exterior space;

a first passageway extending through the side wall into the upper end of the interior space and including an inlet disposed in the interior space at the upper end and an outlet disposed in the exterior space; and a second passageway extending through the side wall into the lower end of the interior space and including an inlet disposed in the exterior space and an outlet disposed in the interior space adjacent the upper end, the second passageway including a generally horizontal section extending across the lower end of the interior space, the generally horizontal section having a heat conductive surface exposed to the interior space so that heat is transferred between the second passageway and the interior space of the enclosure, equalizing the temperature of the gas in the second passageway with the gas in the lower end of the interior space to minimize thermally-induced gas flow through the passageways.

10. An enclosure as recited in claim 9, wherein the inlet and outlet of the first passageway are at the same height relative to the enclosure, and the first passageway includes a generally horizontal section that extends between the inlet and the outlet of the first passageway.

11. An enclosure as recited in claim 9, wherein the inlet of the first passageway is disposed at a height equal to or above the height of the outlet of the second passageway.

12. An enclosure recited in claim 9, wherein the first passageway includes a straight, horizontally extending upper tube.

13. An enclosure as recited in claim 9, wherein the second passageway includes a lower tube having horizontally and vertically extending sections disposed in the interior space.

14. An enclosure as recited in claim 13, wherein the lower tube of the second passageway extends through the side wall.

15. An enclosure as recited in claim 13, wherein the lower tube of the second passageway extends through the floor.

* * * * *